United States Patent [19]

Komura et al.

[11] Patent Number: 5,280,208
[45] Date of Patent: Jan. 18, 1994

[54] COMPOSITE BEARING STRUCTURE

[75] Inventors: Osamu Komura; Kenji Matsunuma; Norio Yasuoka; Matsuo Higuchi; Masaya Miyake; Tetsuya Katayama; Akira Yamakawa, all of Hyogo, Japan

[73] Assignee: Sumitomo Electric Industries, Ltd., Osaka, Japan

[21] Appl. No.: 925,937

[22] Filed: Aug. 5, 1992

[30] Foreign Application Priority Data

Aug. 19, 1991 [JP] Japan .................. 3-206771
Nov. 14, 1991 [JP] Japan .................. 3-298841

[51] Int. Cl.⁵ .................. H02K 7/08; H02K 7/09; F16C 32/06
[52] U.S. Cl. .................. 310/90; 310/90.5; 384/107
[58] Field of Search .......... 310/90, 90.5; 384/100, 384/107, 112

[56] References Cited

U.S. PATENT DOCUMENTS

| | | | |
|---|---|---|---|
| 3,134,037 | 5/1964 | Upton | 310/90 |
| 3,221,389 | 12/1965 | Cowell | 310/90.5 |
| 3,284,144 | 11/1966 | Moore et al. | 384/100 |
| 3,377,113 | 4/1968 | Wilson | 310/90 |
| 3,378,315 | 4/1968 | Webb | 310/90.5 |
| 3,493,274 | 2/1970 | Emslie et al. | 310/90.5 |
| 3,606,500 | 9/1971 | Dee | 384/112 |
| 3,746,407 | 7/1973 | Stiles et al. | 277/80 |
| 3,936,682 | 2/1976 | Gates | 310/90 |
| 3,950,039 | 4/1976 | Huber et al. | 384/112 |
| 4,666,318 | 5/1987 | Harrison | 384/912 |
| 4,797,009 | 1/1989 | Yamazaki | 384/100 |
| 4,972,283 | 11/1990 | Kim | 360/107 |
| 5,019,738 | 5/1991 | Weilbach et al. | 310/90.5 |
| 5,043,615 | 8/1991 | Oshima | 310/90.5 |
| 5,142,173 | 8/1992 | Konno et al. | 310/90 |

FOREIGN PATENT DOCUMENTS

| | | |
|---|---|---|
| 0176315 | 4/1986 | European Pat. Off. . |
| 0178169 | 4/1986 | European Pat. Off. . |
| 0220839 | 5/1987 | European Pat. Off. . |
| 0410293 | 7/1989 | European Pat. Off. . |
| 0401761 | 12/1990 | European Pat. Off. . |
| 3733117 | 4/1988 | Fed. Rep. of Germany . |
| 3829563 | 3/1989 | Fed. Rep. of Germany . |
| 2-173610 | 7/1990 | Japan . |
| 1310526 | 3/1973 | United Kingdom . |
| 2231372 | 11/1990 | United Kingdom . |

OTHER PUBLICATIONS

Testing Method for Flexural Strength (Modulus of Rupture) of High Performance Ceramics JIS R 1601-1981 pp. 1-5.
Yogyo Kyokai-Shi, 1985, vol. 93, pp. 73-80.

Primary Examiner—R. Skudy
Assistant Examiner—C. La Balle
Attorney, Agent, or Firm—W. G. Fasse

[57] ABSTRACT

A composite bearing structure can withstand high speed rotation has first, second and third bearing components. The first bearing component supports a radial impact force applied to a rotator during rotation, and is made of an inner ring (1) and an outer ring (2) of silicon nitride ceramic sintered bodies. The second bearing component supports an axial load applied to the rotator while maintaining a required clearance between itself and the rotator and is made of two permanent magnets (12, 13) positioned thrustdirectionally opposite to each other. The third bearing component maintains a radial rotational accuracy of the rotator, and is made of a radial dynamic pressure producing groove (5) provided on a cylindrical surface of the inner ring (1).

41 Claims, 11 Drawing Sheets

COMPOSITE BEARING STRUCTURE

FIELD OF THE INVENTION

The present invention relates to a bearing structure in general, and more specifically, it relates to a composite bearing structure for supporting a rotator or rotor which constitutes a load and rotates at a high speed.

BACKGROUND INFORMATION

In general, a member forming a rotary part which is provided in a laser printer, a facsimile, a bar code reader or the like must be capable of withstanding high speed rotation. As the printing speed, for example, a rotator of a polygon mirror in a laser printer must rotate at a speed of at least 20000 r.p.m. In a sliding portion of such a rotator, a ball bearing is generally used as a bearing, for example. So far as such a conventional ball bearing is employed, however, the rotator can merely withstand a rotating speed of about 16000 r.p.m. at the maximum, due to problems of burning, wear and the like.

Japanese Patent Laying-Open No. 2-173610 (1990) proposes an air bearing (dynamic pressure gas bearing) of ceramics such as SiC or $Si_3N_4$, which is employed for a rotary sliding portion in order to drive a polygon mirror of a laser printer at a high speed. Upon rotation of a rotator which is supported by such an air bearing, air is forcibly introduced at least into a clearance between a radial bearing member or a thrust bearing member and the rotator through a groove. Thus, the air pressure in the clearance is so increased that the rotator can rotate at a high speed with the aid of the air bearing. In order to implement such high speed rotation, rotational accuracy is maintained during high speed rotation through the air bearing, which is also adapted to support a thrust-directional load being applied to the rotator. The radial bearing member and the rotator, which are formed of ceramics, can withstand a sliding between the members in a low speed region which starting or stopping of the rotator.

When a conventional radial bearing member of ceramics such as $Si_3N_4$ or the like is employed at a high rotating speed exceeding 5000 r.p.m., however, an impacting knock wear phenomenon results from contact between the bearing members. Specifically, the radial impact force applied to the rotator during high speed rotation causes a sliding between the members in a high speed region, and it is difficult for a conventional ceramic sintered body to withstand such a high speed sliding When the radial or thrust bearing member is formed as an air bearing member which is made of a ceramic sintered body, therefore, it is difficult to support a radial impact force suddenly applied to the rotator during high speed rotation, although the rotational accuracy is maintained and a thrust-directional load applied to the rotator is supported.

When the air bearing member is made of ceramics, further, such a ceramic member must be worked or assembled with a high accuracy, and hence the manufacturing cost is increased. In addition, the air bearing member must be used in a clean environment, to be protected against dust. Thus, the structure related to the air bearing member is so complicated that a closed container may be required to contain the same, and the space therefor is disadvantageously increased. In order to solve such a problem, a bushing type slide bearing member made of ceramics may be used as a bearing for high speed rotation.

FIG. 16 is a longitudinal sectional view schematically showing the structure of a conventional bushing type slide bearing member of ceramics. The known bushing type slide bearing member comprises two thrust slide bearing members 81 and 82, a radial slide bearing member 83 and a rotator 84, which are paired with each other. Such a bushing type slide bearing member can withstand a sliding between the members in a low speed region when starting or stopping. Similarly to the aforementioned air bearing member of ceramics, however, an impacting knock wear phenomenon is caused by the contact between the bearing members as a result of a sliding contact following high speed rotation at a speed exceeding 5000 r.p.m. Therefore, it is difficult for the conventional bushing type slide bearing member to withstand such sliding, and hence any frictional resistance is increased by roughened sliding surfaces. This tendency is particularly remarkable with respect to a thrustdirectional load. A thrustdirectional frictional resistance caused by such a thrust load is 5 to 10 times larger than a radial frictional resistance. Thus, when a bushing type slide bearing member of ceramics is employed as a bearing for high speed rotation, it is difficult to support not only a sudden radial impact force during rotation but also a thrust-directional load which is applied to the rotor of the bearing.

SUMMARY OF THE INVENTION

In view of the foregoing it is an object of the present invention to provide a bearing structure which can withstand high speed rotation.

Another object of the present invention is to protect a bearing member against a wear phenomenon caused by a sudden radial impact force which is applied to a rotator during high speed rotation.

Still another object of the present invention is to suppress an increase in the frictional resistance caused in a bearing member in accordance with a thrust-directional load which is applied to a rotator during high speed rotation.

A further object of the present invention is to provide a bearing structure which can maintain a rotational accuracy at a high speed rotation for a long time.

A composite bearing structure according to the present invention, which is adapted to support a rotator having a prescribed load and rotating at a high speed, comprises first bearing means, second bearing means and third bearing means. The first bearing means includes a ceramic sintered body for supporting a radial impact force which is applied to the rotator during rotation. The second bearing means supports an axial load which is applied to the rotator while maintaining a prescribed clearance between the second bearing means and the rotator. The third bearing means maintains radial rotational accuracy of the rotator.

Even if a sudden radial impact force is applied to the rotator which rotates at a high speed, the ceramic sintered body forming the first bearing means can support the impact force and withstand a sliding contact at a high speed. Further, the second bearing means supports an axial (thrust-directional) load which is applied to the rotator, while maintaining a clearance between the same and the rotator. Therefore, even if the rotator rotates at a high speed, it is possible to reduce the increase rate of frictional resistance which is caused due to the thrust-directional load. In addition, the third bearing means maintains a radial rotational accuracy of the rotator which rotates at a high speed. Thus, it is possible to maintain the rotational accuracy, which is required for a precision instrument, even for long time periods.

According to the present invention, as hereinabove described, the composite bearing structure comprises the first, second and third bearing means constructed and arranged so that no wear phenomenon is caused by a sudden impact force during high speed rotation and any increase in the frictional resistance caused by a thrust-directional load applied to the rotator is suppressed while the rotational accuracy is maintained for a long time. According to the present invention, therefore, it is possible to provide a composite bearing structure which is suitable for supporting a rotator rotating at a high speed.

According to a first preferred aspect of the present invention, the ceramic sintered body forming the first bearing means includes a silicon nitride ceramic sintered body which contains crystal grains having a linear density of at least 35 grains per 30 $\mu$m length, with a boundary phase volume ratio of not more than 15 percent by volume. Further, the silicon nitride sintered body contains pores of not more than 20 $\mu$m in maximum diameter, wherein all pores together have a volume of not more than 3 percent of the entire volume. Such a silicon nitride sintered body has mechanical properties according to the JIS three-point bending strength test as follows: at least 80 kg/mm$^2$, preferably at least 100 kg/mm$^2$, and a fracture toughness of at least 5 MPa.m$^{\frac{1}{2}}$ (JIS=Japanese Industrial Standards).

In the first preferred embodiment of the present invention, the silicon nitride sintered body forming the first bearing means contains crystal grains having a linear density of at least a constant value, while the boundary phase volume rate and the porosity thereof are suppressed below constant values. Thus, a bearing member is formed as a silicon nitride sintered body which contains fine crystal grains. Consequently, the surface of the silicon nitride sintered body forming the bearing member is not chipped by falling off crystal grains or the like. Rather, such a sintered body has an excellent chipping resistance, whereby the aforementioned silicon nitride sintered body also has an excellent wear resistance against high speed sliding contact accompanied by a knock wear phenomenon. Therefore, a sudden radial impact force applied to the rotator during high speed rotation is supported by the silicon nitride sintered body, which provides an excellent wear resistance against any resulting high speed sliding.

In a second preferred embodiment of the present invention, the second bearing means includes dynamic pressure gas bearing means which supports a load by a gas pressure produced by rotation of the rotator. The second bearing means alternatively includes magnetic bearing means which supports the load through magnetic attraction or repulsion. Each of the dynamic pressure gas bearing means and the magnetic bearing means includes a rotating member which rotates with the rotator, and a fixed member which is opposed to the rotating member while maintaining an axial clearance between itself and the rotating member. In the dynamic gas bearing means, the rotating member and the fixed member include ceramic sintered bodies, while one of the rotating and fixed members is provided with a groove for introducing a gas into the clearance for producing a gas pressure. In the magnetic bearing means, on the other hand, the rotating and fixed members include magnets for generating magnetic attraction or repulsion in the clearance.

In the second embodiment of the present invention, the dynamic gas bearing means can support or reduce a thrust-directional load, which most heavily contributes to an increase of frictional resistance in the bearing member, by the pressure of the gas being introduced into the clearance through the groove. Alternatively, the magnetic bearing means can support or reduce the thrust-directional load by a magnetic repulsion or attraction. Thus, it is possible to effectively suppress an increase of a driving torque as the rotating speed increases. Particularly when the second bearing means is formed as a magnetic bearing means, it is possible to suppress such an increase of the driving torque even more effectively as the rotating speed increases with the dynamic gas bearing means.

According to a third preferred embodiment of the present invention, the third bearing means includes a ceramic sintered body which maintains a rotational accuracy while also maintaining a prescribed clearance between itself and the rotator. In this case, it is in principle possible to improve the rotational accuracy by minimizing the clearance.

According to a further preferred aspect of the third embodiment of the present invention, the third bearing means includes dynamic gas bearing means which maintains rotational accuracy by a gas pressure produced by the rotation of the rotator. The dynamic gas bearing means includes a rotating member which rotates with the rotator, and a fixed member which is opposed to the rotating member while maintaining a radial clearance. The rotating member and the fixed member are ceramic sintered bodies. Either one of the rotating and fixed members is provided with a groove for introducing a gas into the clearance for producing a gas pressure. When the third bearing means is thus prepared gas dynamic pressure gas bearing means, it is possible to highly maintain the rotational accuracy during high rotation for a long time, even if the clearance between the rotating and fixed members is relatively increased.

In a further preferred aspect of the third embodiment of the present invention, the third bearing means includes magnetic bearing means which maintains a rotational accuracy through magnetic attraction or repulsion, while maintaining a prescribed clearance between itself and the rotator. This magnetic bearing means includes a rotating member which rotates with the rotator, and a fixed member which is opposed to the rotating member while maintaining a radial clearance. The rotating member and the fixed member include magnets for generating magnetic attraction or repulsion in the clearance. The rotating and fixed members are formed as ceramic sintered bodies, and the magnets are embedded in these ceramic sintered bodies. When the third bearing means is constructed as magnetic bearing means, it is possible to highly maintain the rotational accuracy during high speed rotation for a long time, even if the clearance between the rotating and fixed members is relatively increased.

As hereinabove described, the present invention can provide various composite bearing structures which are suitable for supporting rotators rotating at high speeds.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Table 1 shows various Structural Examples A and C to G of composite bearing members according to the present invention, which are formed by radial bearing means and thrust bearing means, and comparative structural examples B and H. FIGS. 1 to 8 schematically illustrate Structural Example A, comparative structural example B, Structural Examples C to G, and comparative structural example H, respectively. Referring to Table 1 and FIGS. 1 to 8, the structural examples and the comparative examples will now be described as follows.

TABLE 1

| | Radial | | | |
|---|---|---|---|---|
| | Ceramic Air Bearing | Magnetic Bearing | Magnetic Bearing + Ceramic Bushing | Ceramic Bushing |
| Thrust | | | | |
| Ceramic Air Bearing | A (FIG. 1) | B (FIG. 2) | C (FIG. 3) | D (FIG. 4) |
| Magnetic Bearing | E (FIG. 5) | — | F (FIG. 6) | G (FIG. 7) |
| Ceramic or Sleeve Bearing | — | — | — | H (FIG. 8) |

Structural Example A

Figure 1:
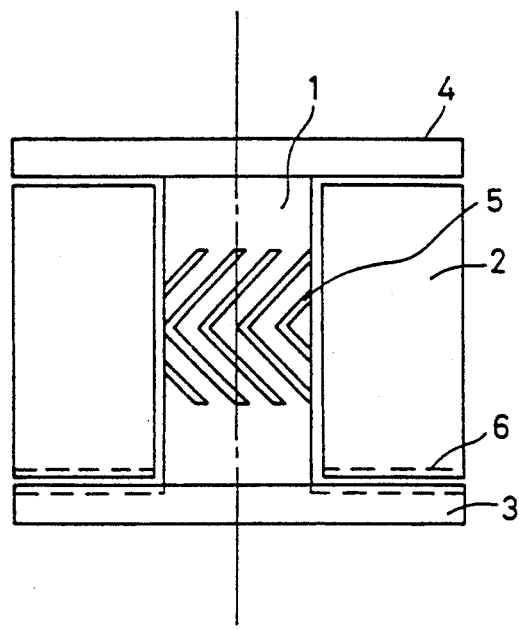
FIG. 1 shows schematically showing a composite bearing member according to Structural Example A of the present invention.

Referring to FIG. 1, the composite bearing structure comprises an inner ring 1, an outer ring 2, a lower thrust plate 3 and an upper thrust plate 4. These members 1 to 4 are formed as silicon nitride ceramic sintered bodies. The inner ring 1 has a cylindrical shape and encircles the outer peripheral surface of a shaft not shown. A plurality of V-shaped grooves 5 for producing radial dynamic pressure, are formed in the cylindrical surface of the inner ring 1. The lower and upper thrust plates 3 and 4 are secured to be the respective end surfaces of the inner ring 1. The outer ring 2, also having a cylindrical shape, is so dimensioned that a prescribed clearances is provided between the outer ring 2 and the cylindrical surface of the inner ring 1 and between the axial end faces of the outer ring 2 and the respective inner side surfaces of the lower and upper thrust plates 3 and 4. A plurality of thrust dynamic pressure producing grooves 6 are provided in opposite surfaces of the outer ring 2 and of the lower thrust plate 3. These thrust dynamic pressure producing grooves 6, which are formed in both of the outer ring 2 and the lower thrust plate 3 in this embodiment, may alternatively be formed only in one of these members.

In the composite bearing member having the aforementioned structure, it is assumed that the outer ring 2 rotates with a rotator while the inner ring 1 and the thrust plates 3 and 4 are fixed to a shaft. When the outer ring 2 rotates with the rotator, air is introduced into the clearances between the outer ring 2 and the inner ring 1 as well as the lower thrust plate 3 along the radial dynamic pressure producing grooves 5 and the thrust dynamic pressure producing grooves 6, to maintain the clearances in the air bearing constant. The outer ring 2 can rotate with the rotator at a high speed by air pressures being produced in the clearances, without coming into contact with the inner ring 1 and the thrust plates 3 and 4.

According to Structural Example A, both radial and thrust bearing members are formed by ceramic air bearing members. Therefore, the radial rotational accuracy is maintained by the radial air bearing member, while a thrust-directional load is supported by the thrust air bearing member. Further, the ceramic sintered bodies forming the air bearing members are made of silicon nitride sintered bodies, which support a sudden radial impact force during high speed rotation.

Comparative Structural Example B

Figure 2A:
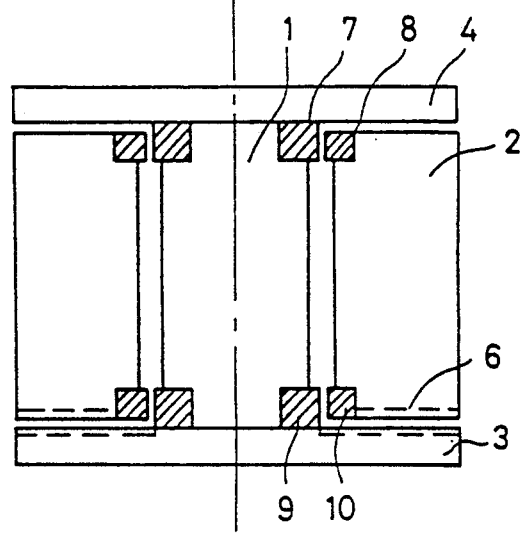
FIG. 2(A) is a conceptual diagram schematically a composite bearing member according to comparative structural example B.
Figure 2B:
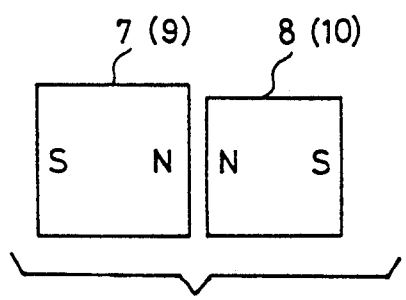
FIG. 2(B) is an enlarged view showing permanent magnets employed therein.

FIG. 2(A) schematically shows a composite bearing structure according to a comparative example B for the present invention, and FIG. 2(B) is an enlarged view showing permanent magnets employed in this bearing structure. Referring to FIG. 2(A), the composite bearing member according to comparative example B comprises an inner ring 1, an outer ring 2, a lower thrust plate 3 and an upper thrust plate 4. These members 1 to 4 have base materials of silicon nitride ceramic sintered bodies. The inner ring 1 has a cylindrical shape, encircling the outer peripheral surface of a shaft not shown. The thrust plates 3 and 4 are connected with the respective end surfaces of the inner ring 1. The outer ring 2 is dimensioned to maintain prescribed clearances between the outer ring and the cylindrical surface of the inner ring 1 and between the end faces of the ring 2 and the inner side surfaces of the thrust plates 3 and 4. In this comparative example B, ring-type permanent magnets 7, 8, 9 and 10 are arranged on opposite cylindrical surfaces of the inner and outer rings 1 and 2. Further, spiral thrust dynamic pressure producing grooves 6 are formed in opposite surfaces of the outer ring 2 and the lower thrust plate 3.

When the outer ring 2 rotates with a rotator in this composite bearing structure, air is introduced into the clearance between the outer ring 2 and the lower thrust plate 3 along the thrust dynamic pressure producing grooves 6, to maintain the clearance in the air bearing constant. On the other hand, the permanent magnets 7 (9) and 8 (10) of the inner and outer rings 1 and 2 are so arranged that the same poles are opposite to each other as shown in FIG. 2(B), thereby maintaining the clearance between the inner and outer rings 1 and 2 constant by repulsion.

As hereinabove described, a thrust-directional load applied during high speed rotation is supported by an air bearing member while the radial rotational accuracy is maintained by a magnetic bearing member in comparative structural example B. When a sudden radial impact force is applied to the rotator during high speed rotation, however, the opposite permanent magnets 7 (9) and 8 (10) inevitably come into contact with each other. Thus, this structure is weak against radial impact force.

Structural Example C

Figure 3A:
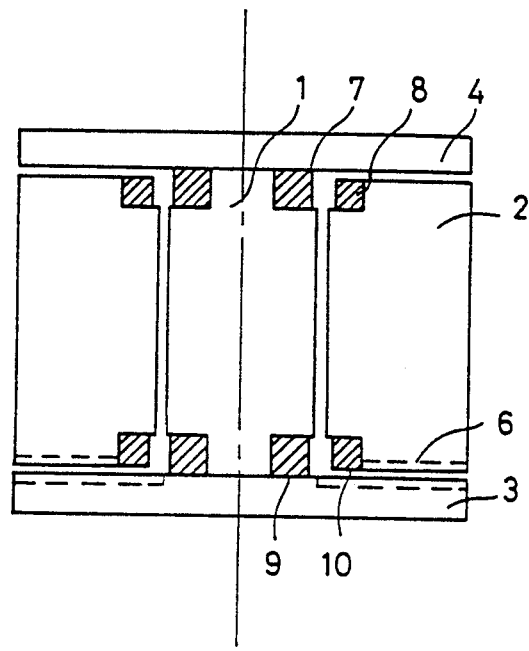
FIGS. 3(A) and 3(B) show schematically two composite bearing members according to Structural Example C of the present invention, respectively.
Figure 3B:
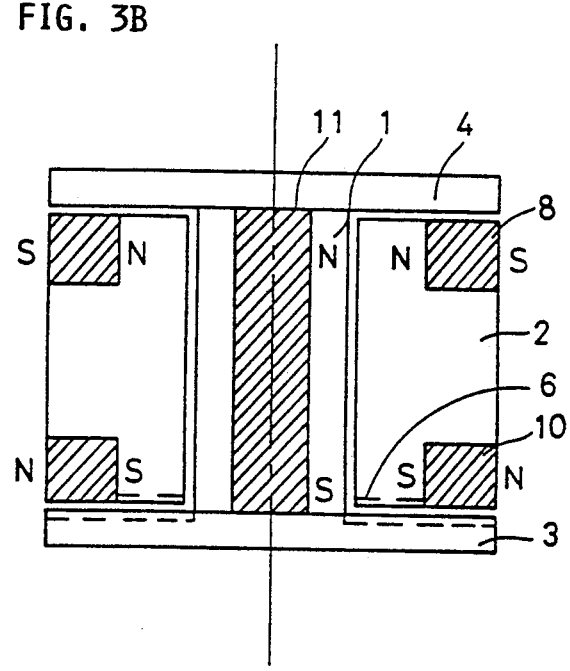

FIGS. 3(A) and 3(B) show schematically composite bearing structures according to another embodiment of the present invention. Referring to FIG. 3(A), the composite bearing member comprises an inner ring 1, an outer ring 2 and thrust plates 3 and 4. These members 1 to 4 are mainly made of silicon nitride ceramic sintered bodies. Each of the thrust plates 3 and 4 is connected with the respective end surface of the inner ring 1. The outer ring 2 is dimensioned to define prescribed clearances between the outer the and a cylindrical surface of the inner ring 1 and between the end faces of the outer ring 2 and the inner side surfaces of the thrust plates 3 and 4. In this Structural Example C, permanent magnets 7 to 10 are provided on opposite cylindrical surfaces of the inner and outer rings 1 and 2. Further, a plurality of spiral thrust dynamic pressure producing grooves 6 are formed in opposite surfaces of the outer ring 2 and the lower thrust plate 3. The clearance between the inner and outer rings 1 and 2 is defined as a first clearance between the ceramic sintered bodies forming these rings 1,2, and a second clearance is defined between the permanent magnets 7 (9) and 8 (10). The second clearance is larger than the first clearance.

When the outer ring 2 rotates with a rotator in the composite bearing member having the aforementioned structure, air is introduced into the clearance between the outer ring 2 and the lower thrust plate 3, to maintain the clearance constant in the air bearing. In the radial direction, on the other hand, repulsion generated between the permanent magnets 7 (9) and 8 (10) maintains a constant clearance, thereby maintaining a rotational accuracy during high speed rotation Even if a sudden radial impact force is applied to the rotator during such rotation, the inner and outer rings 1 and 2 come into contact with each other not between the permanent magnets 7 to 10 but between the silicon nitride sintered bodies having high strength. Thus, no impact knock wear phenomenon is caused by contact of the inner and outer rings 1 and 2 when a sliding contact occurs following a high speed rotation.

Thus, Structural Example C provides a composite bearing structure, which cannot only maintain a radial rotational accuracy and support the thrust-directional load but also withstand a sudden radial impact force.

FIG. 3(B) shows another type of Structural Example C. This structure is different from that shown in FIG. 3(A) in that a permanent magnet 11 is embedded in an inner ring 1, while permanent magnets 8 and 10 are provided on an outer peripheral cylindrical surface of an outer ring 2. In this case, the permanent magnets 8, 10 and 11 generate repulsion through ceramic sintered bodies forming the inner and outer rings 1 and 2, respectively. In this case, a clearance between the inner and outer rings 1 and 2 is set in consideration of the repulsion between the permanent magnets 8, 10 and 11 required for maintaining prescribed rotational accuracy.

Structural Example D

Figure 4:
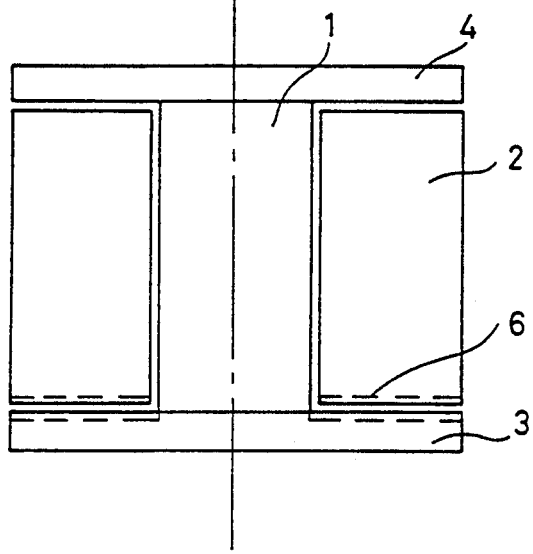
FIG. 4 shows schematically a composite bearing member according to Structural Example D of the present invention.

FIG. 4 shows schematically a composite bearing structure according to still another embodiment of the present invention. Referring to FIG. 4, the composite bearing member comprises an inner ring 1, an outer ring 2 and thrust plates 3 and 4. These members 1 to 4 are made of silicon nitride ceramic sintered bodies. The inner ring 1 has a cylindrical shape, encircling by the outer peripheral surface of a shaft not shown. The thrust plates 3 and 4 are connected with the respective end surface of the inner ring 1. The outer ring 2 to maintains a required clearance between itself and the thrust plates 3 and 4 as well as the inner ring 1 respectively. Spiral thrust dynamic pressure producing grooves 6 are provided in opposite surfaces of the outer ring 2 and the lower thrust plate 3. The clearance between the inner and outer rings 1 and 2 is set at a small value sufficient for maintaining the required rotational accuracy during high speed rotation. Thus, a thrust-directional load is supported by an air bearing member constructed in the aforementioned manner, while the radial rotational accuracy is maintained by the small clearance between the inner and outer rings 1 and 2. Further, a sudden radial impact force applied during a high speed rotation is supported by the silicon nitride ceramic sintered bodies having high strength forming the inner and outer rings 1 and 2.

Structural Example E

Figure 5:
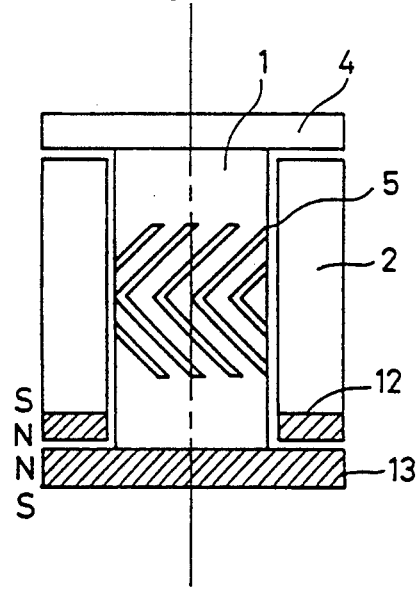
FIG. 5 shows schematically showing a composite bearing member according to Structural Example E of the present invention.

FIG. 5 shows schematically a composite bearing member according to a further embodiment of the present invention. Referring to FIG. 5, the composite bearing member comprises an inner ring 1, an outer ring 2, a lower thrust plate 13 and an upper thrust plate 4. The inner and outer rings 1 and 2 and the upper thrust plate 4 are mainly made of silicon nitride ceramic sintered bodies. The inner ring 1 has a cylindrical shape encircling the outer peripheral surface of a shaft not shown. A plurality of V-shaped radial dynamic pressure producing grooves 5 are formed in the cylindrical surface of the inner ring 1. The lower thrust plate 13 is made of a permanent magnet, while the outer ring 2 is provided with a ring-shaped permanent magnet 12 on a surface opposite to the lower thrust plate 13.

When the outer ring 2 rotates with a rotator in the composite bearing member having the aforementioned structure, air is introduced into a clearance between the inner and outer rings 1 and 2 along the radial dynamic pressure producing grooves 5, to maintain the clearance of the air bearing constant, whereby the required radial rotational accuracy is maintained. Further, the permanent magnet 12 of the outer ring 2 and the lower thrust plate permanent magnet 13 generate a repulsion, to maintain a prescribed clearance between the outer ring 2 and the lower thrust plate 13. Thus, a thrust-directional load is supported during high speed rotation. In addition, the inner and outer rings 1 and 2 are made of silicon nitride ceramic sintered bodies having a high strength, whereby no knock wear phenomenon is caused even if the inner ring 1 comes into contact with the outer ring 2 due to a of sudden impact force during high speed rotation.

Thus, Structural Example E provides a composite bearing member, which cannot only maintain the rotational accuracy and support a thrust-directional load during high speed rotation, but also can withstand an impact force during the high speed rotation.

Structural Example F

Figure 6A:
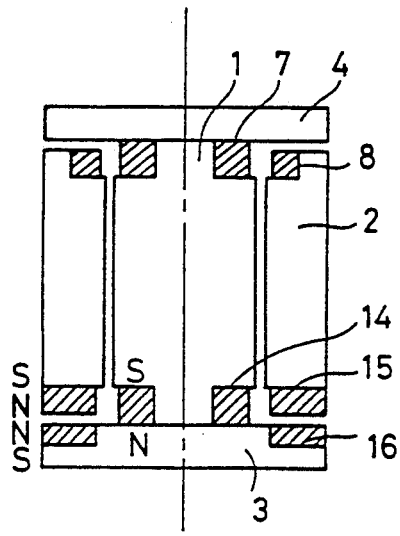
FIGS. 6(A) and 6(B) show schematically two composite bearing members according to Structural Example F of the present invention.
Figure 6B:
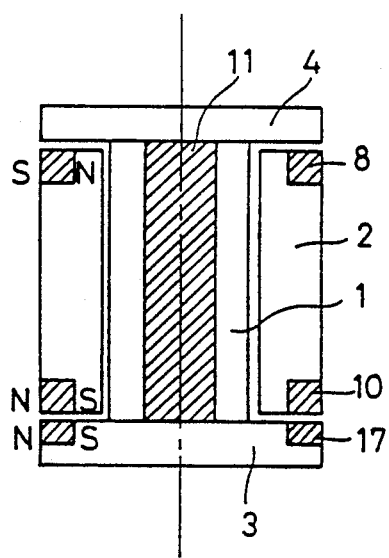

FIGS. 6(A) and 6(B) show schematically structures of composite bearing members according to a further embodiment of the present invention. Referring to FIG. 6(A), the composite bearing member comprises an inner ring 1, an outer ring 2 and thrust plates 3 and 4. These members 1 to 4 are mainly made of silicon nitride ceramic sintered bodies. This Example is different from Structural Example C shown in FIG. 3(A) in the structure of a thrust-directional bearing member. Permanent magnets 15 and 16 are provided on opposite surfaces of the outer ring 2 and the lower thrust plate 3. The permanent magnet 15 is also opposed to a permanent magnet 14 which is provided on the inner ring 1. Thus, a thrust-directional load is supported by a magnetic bearing member. According to this Structural Example F, the magnetic bearing member maintains a radial rotational accuracy and supports the thrust-directional load, while the ceramic sintered bodies having high strength support a radial impact force.

FIG. 6(B) shows another type of Structural Example F. This structure is different from Structural Example C shown in FIG. 3(B) in that a thrust-directional load is not supported by an air bearing member, but by a magnetic bearing member, namely, a permanent magnet 17 provided on a lower thrust plate 3 is opposed to a permanent magnet 10 which is provided on an outer ring 2.

Structural Example G

Figure 7A:
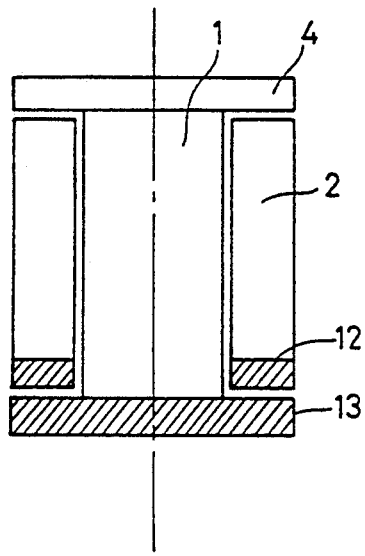
FIGS. 7(A) and 7(B) show schematically two composite bearing members according to Structural Example G of the present invention.
Figure 7B:
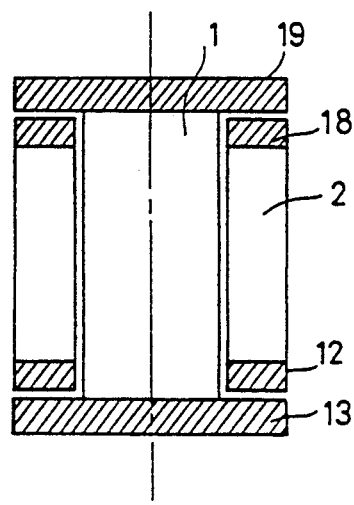

FIGS. 7(A) and 7(B) show schematically structures of composite bearing members according to a further embodiment of the present invention. Referring to FIG. 7(A), the composite bearing member comprises an inner ring 1, an outer ring 2, a lower thrust plate 13 and an upper thrust plate 4. The inner and outer rings 1 and 2 and the upper thrust plate 4 are mainly made of silicon nitride ceramic sintered bodies. The inner ring 1 has a cylindrical shape, encircling the outer peripheral surface of a shaft not shown. The thrust plates 13 and 4 are connected with the respective end surfaces of the inner ring 1. The lower thrust plate 13 is made of a permanent magnet. The outer ring 2 is provided with a permanent magnet 12 on a surface opposite to the lower thrust plate 13. A clearance between the inner and outer rings 1 and 2 is set at a small value for maintaining a required rotational accuracy during a high speed rotation. Thus, a thrust-directional load is supported by repulsion generated by the permanent magnet 12 and the lower thrust plate permanent magnet 13, while a radial impact force is supported by the silicon nitride sintered bodies having high strength forming the inner and outer rings 1 and 2.

Referring to FIG. 7(B), on the other hand, the composite bearing member comprises an upper thrust plate 19 of a permanent magnet and an outer ring 2 which is provided with a permanent magnet 18 on a surface opposite thereto for maintaining a required rotational accuracy during high speed rotation, even if a clearance between an inner ring 1 and the outer ring 2 is set at a larger value as compared with the composite bearing member shown in FIG. 7(A). This is so, because upper and lower portions of the outer ring 2 are held by magnetic bearings, which suppress an inclination of the outer ring 2 during high speed rotation.

Comparative Structural Example H

Figure 8:
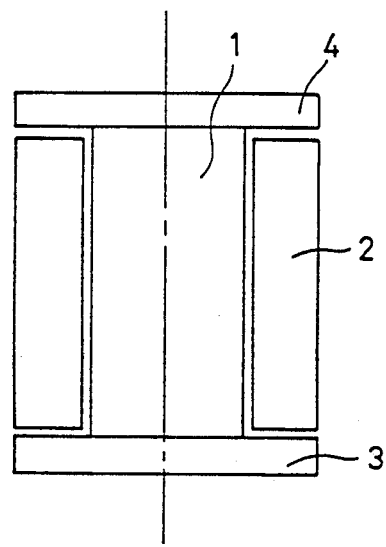
FIG. 8 shows schematically a composite bearing member according to comparative structural example H.

FIG. 8 shows schematically the structure of a composite bearing member according to comparative example H for the present invention. Referring to FIG. 8, the composite bearing member comprises an inner ring 1, an outer ring 2 and thrust plates 3 and 4. These members 1 to 4 are made of silicon nitride ceramic sintered bodies. The inner ring 1 has a cylindrical shape encircling the outer peripheral surface of a shaft not shown. The thrust plates 3 and 4 are connected with the respective end surfaces of the inner ring 1. The outer ring 2 maintains the required clearances between itself and the inner ring 1 and between itself and the thrust plates 3 and 4. According to the composite bearing member having the aforementioned structure, the clearance between the inner and outer rings 1 and 2 is set at a small value, for maintaining a radial rotational accuracy during a high speed rotation. Further, a sudden impact force during a high speed rotation is supported by the silicon nitride ceramic sintered bodies having high strength forming the inner and outer rings 1 and 2. However, it is difficult to support a thrust-directional load by the thrust plates 3 and 4 during a high speed rotation.

As to support structures for thrust-directional loads, the structure of the magnetic bearing members according to Structural Examples E to G can be simplified as compared with the air bearings according to Structural Examples A, C and D and comparative structural example B. In order to support a thrust-directional load by an air bearing member, a constant area is required for ensuring lift. Further, an air bearing member cannot generate lift unless the rotating speed exceeds a constant value, while a magnetic bearing member can generate lift immediately when rotation starts.

A means for improving the radial rotational accuracy is effectively formed by a radial air bearing member, see structural Example A or E, or a combination with a magnetic bearing member, see comparative structural example B, or Structural Example C or F bushing. Also when a bush type slide or sleeve bearing member is employed, it is possible to improve the rotational accuracy by setting a clearance gap between inner and outer rings at a small value, see Structural Example D or G, or comparative structural example H.

Except for comparative structural example B employing no ceramic sintered body for the radial bearing member, every one of the aforementioned structures can satisfy radial impact resistance requirements and causes no burning even if an impact force is applied during a high speed rotation and the inner and outer rings come into contact with each other. Particularly, when silicon nitride ceramic sintered bodies having high strength are employed, it is possible to maintain excellent bearing characteristics since no chipping is caused.

In relation to a material for a radial impact resistant member of the present composite bearing structure, a method of preparing a silicon nitride sintered body will now be described.

Raw material powder of $Si_3N_4$ was prepared to have a mean particle diameter of 0.3 $\mu$m, particle size distribution of $3\rho = 0.20$ $\mu$m, an $\alpha$ crystallization rate of 96.5 percent and an oxygen content of 1.4 percent by weight. 92 percent by weight of this $Si_3N_4$ raw material powder was wet-blended with 4 percent by weight of $Y_2O_3$ powder of 0.8 $\mu$m in mean particle diameter, 3 percent by weight of $A\lambda_2O_3$ powder of 0.5 $\mu$m in mean particle diameter, and 1 percent by weight of $A\lambda N$ powder of 1.0 $\mu$m in mean particle diameter in ethanol for 100 hours with a ball mill. Thereafter the mixed powder was dried and subjected to CIP (cold isostatic pressing) molding under a pressure of 5000 kg/cm$^2$. The as-formed compact was held under a nitrogen gas atmosphere of 1 atm. at a temperature of 1600° C. for 4 hours. Then, the compact was sintered at a temperature of 1750° C. for 6 hours, to obtain a sintered body. Thereafter this sintered body was subjected to HIP (hot isostatic pressing) in a gaseous nitrogen atmosphere of 1000 atm. at a temperature of 1700° C. for 2 hours.

The resulting silicon nitride sintered body exhibited a mean major axis particle diameter of not more than 5 $\mu$m, a crystal grain aspect ratio of at least 4, and the maximum major axis particle diameter of not more than 15 $\mu$m. As to mechanical properties, this sintered body exhibited a JIS three-point bending strength of at least 80 kg/mm$^2$ and a fracture toughness of at least 5 MPa·m$^{\frac{1}{2}}$. Test pieces of samples a to e were cut out from this sintered body and subjected to an Amsler type wear resistance test for evaluation of the wear resistance.

Figure 9A:
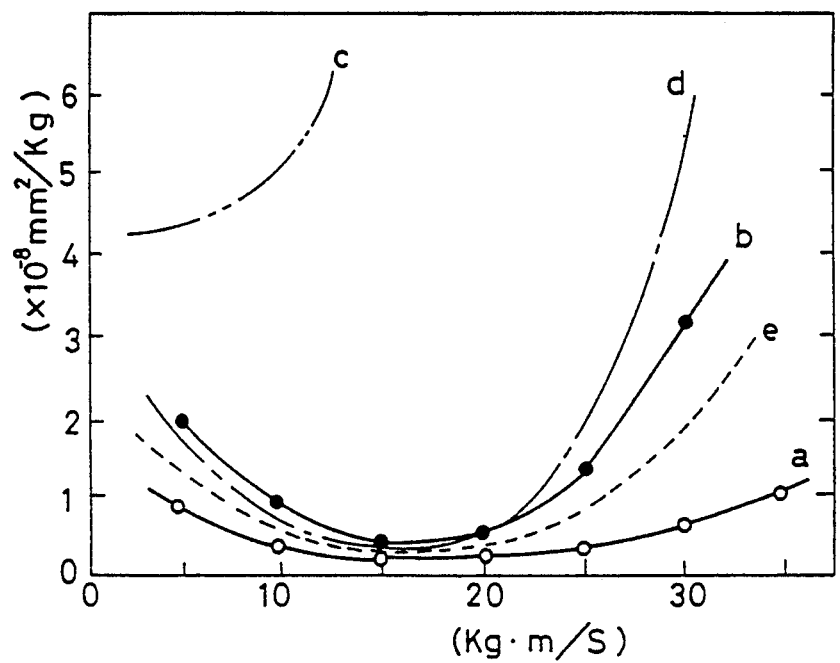
FIGS. 9(A) and 9(B) are graphs showing wear rates of sintered bodies forming radial impact resistant members as a function of P.V values of composite bearing structure according to the present invention and, of conventional, of comparative examples.

FIG. 9(A) is a graph showing relations between products (P·V) of loads being applied to the samples a to e and rotating speeds, and wear rates. Referring to FIG. 9(A), curves a to e show the results of measuring of the following samples:

Present Sample a: A silicon nitride sintered body obtained by the aforementioned method, with a linear density of 40 crystal grains per 30 $\mu$m length, a boundary phase volume a ratio of 8 percent by volume, porosity of 0.05 percent, and a maximum pore diameter of 8 $\mu$m.

Comparative Sample b: A silicon nitride sintered body obtained by the aforementioned method, with a linear density of 30 crystal grains per 30 $\mu$m length, a boundary phase volume ratio of 16 percent by volume, a porosity of 3.2 percent, and the maximum pore diameter of 22 $\mu$m.

Conventional Samples c, d and e: Silicon nitride sintered bodies described in Yogyo Kyokai-Shi, 1985, vol. 93, pp. 73 to 80 (FIG. 3, in particular).

Regarding to the Amsler wear resistance test, two ring-type samples of $\phi$16 mm by $\phi$30 mm by 8 mm were fixed to a rotary shaft of a testing machine so that circumferential surfaces thereof were correctly in contact with each other, and a prescribed load was applied to drive the rotary shaft at a prescribed rotating speed thereby performing a sliding test of about 100000 revolutions. Thereafter degrees of weight reduction of the two samples were measured.

Figure 9B:
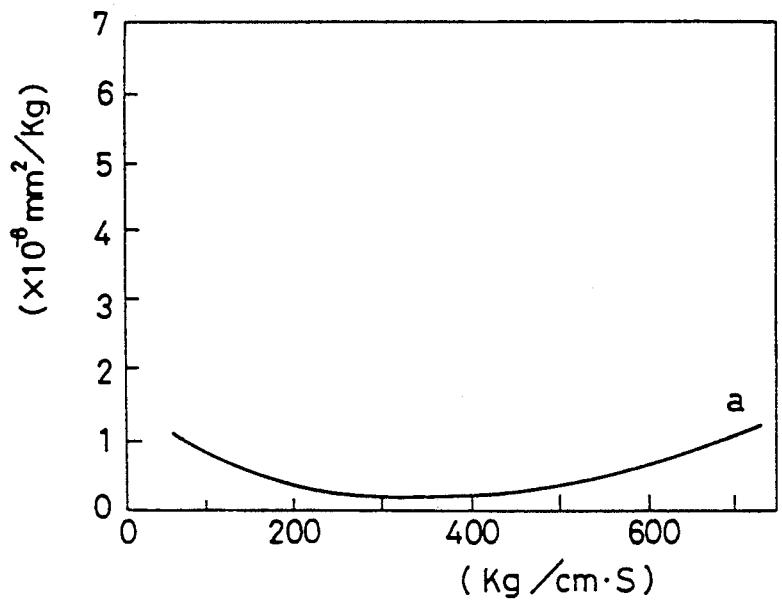

As clearly understood from FIG. 9(A), the present sintered body has a remarkably excellent wear resistance. FIG. 9(B) shows the P·V values (kg·m/s) appearing in FIG. 9(A) in terms of the unit areas of the sliding surfaces.

Consider that a sintered body prepared in the aforementioned manner is exposed to sliding during a high speed rotation of a rotating polygon mirror for a laser printer, for example. The polygon mirror is in the form of a polyhedron (hexa- to icosahedron) which is received in a circumscribing cylinder of about $\phi$30 to 150 mm, with u a thickness of about 10 mm and a weight in a range of about 20 to 500 g. Assuming that a bearing member for supporting the polygon mirror is has a diameter of 10 mm and the polygon mirror rotates at a speed of 2000 to 100000 r.p.m., its circumferential speed is 100 to 5200 cm/s. Assuming that the bearing area is 3.14 cm$^2$, the P·V value (kg/cm·s) is 1 to 828 kg/cm·s. Refer to FIG. 9(B) as to the P·V values in this range. The present sintered body exhibits a low wear rate with respect to a wide range of P·V values of 1 to 600 kg/cm·s, and can sufficiently withstand sliding during a high speed rotation of the polygon mirror.

In the aforementioned example, it is assumed that the sintered body regularly slides during high speed rotation. Even in such a case, the present sintered body exhibits a low wear rate with respect to a wide range of P·V values. Even if a sudden impact force is applied to cause a sliding following a high speed rotation, the present sintered body can sufficiently withstand such sliding.

The aforementioned Structural Examples G and D and comparative structural example H were subjected to an evaluation of the bearing performance in testing machines which will now be described.

Figure 10:
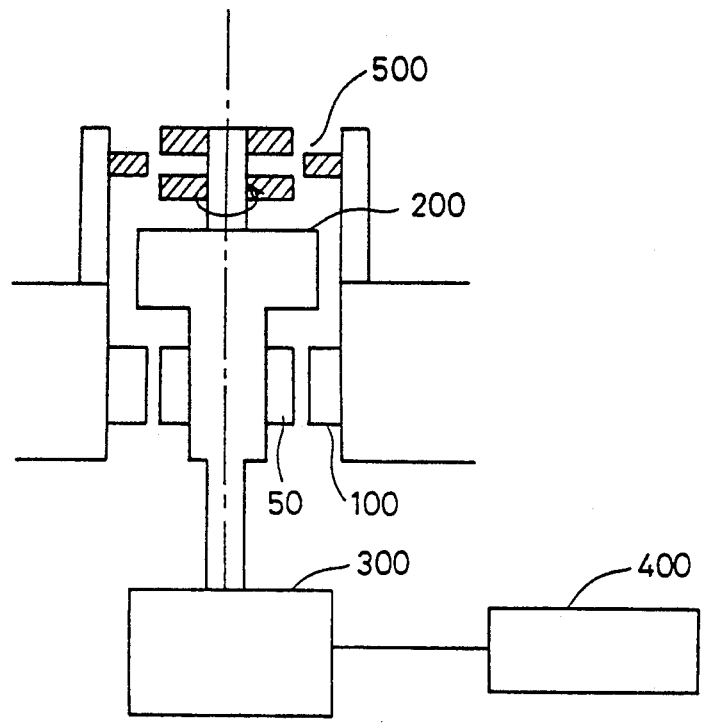
FIG. 10 schematically illustrates the structure of a testing machine employed for evaluating the bearing performance of the composite bearing member according to Structural Example G of the present invention.

FIG. 10 schematically illustrates a testing machine which was employed for evaluating the bearing performance of Structural Example G. An inner ring 50 of the aforementioned silicon nitride sintered body was prepared with an inner diameter of 10 mm, for rotation with a rotator 200. An outer ring 100 of the aforementioned silicon nitride sintered body was prepared and dimensioned to maintain a prescribed clearance between the ring 100 and the inner ring 50. A magnetic bearing 500 formed by repulsion of a ferrite magnet was mounted on an upper portion of the rotator 200.

Figure 11:
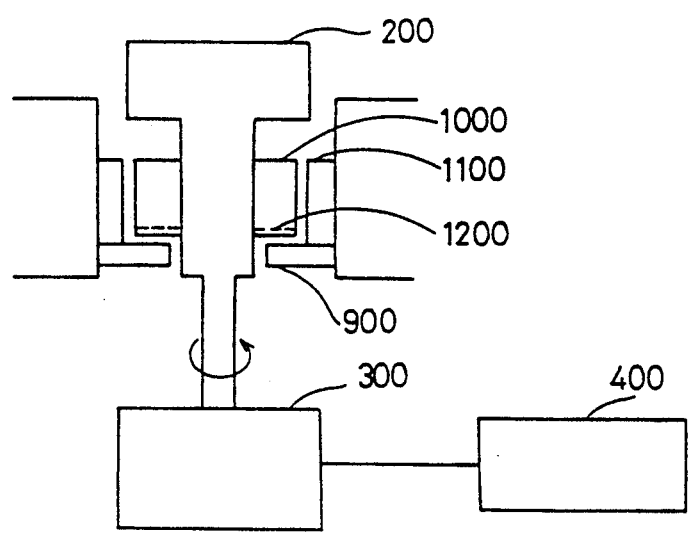
FIG. 11 schematically illustrates the structure of a testing machine employed for evaluating the bearing performance of the composite bearing member according to Structural Example D of the present invention.

FIG. 11 schematically illustrates a testing machine which was employed for evaluating the bearing performance of Structural Example D. An inner ring 1000 of the aforementioned silicon nitride sintered body was prepared with an inner diameter of 10 mm for rotation with a rotator 200. An outer ring 1100 of the aforementioned silicon nitride sintered body was prepared and dimensioned to maintain a prescribed clearance between the ring 1100 and the inner ring 1000. A thrust plate 900 of a silicon nitride ceramic sintered body was provided under the outer ring 1100. A spiral dynamic pressure producing groove 1200 was formed in a surface of the inner ring 1000 opposite to the thrust plate 900.

Figure 12:
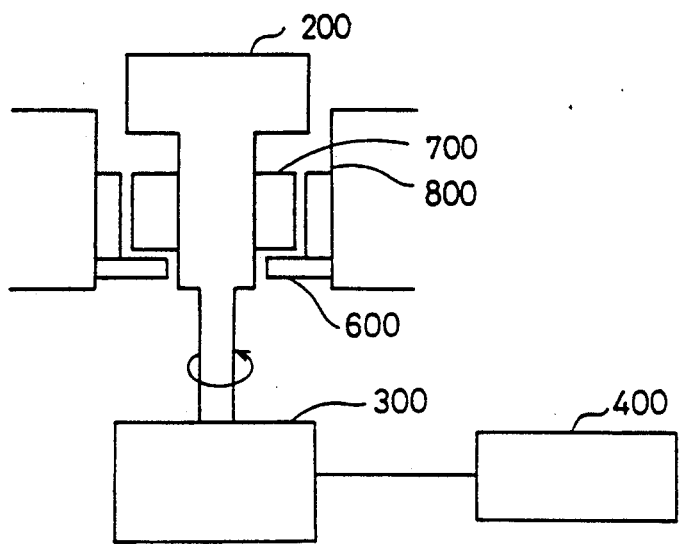
FIG. 12 schematically illustrates the structure of a testing machine employed for evaluating the bearing performance of comparative structural example H compared to the present invention.

FIG. 12 schematically illustrates a testing machine which was employed for evaluating the bearing performance of comparative structural example H. An inner ring 700 of the aforementioned silicon nitride sintered body was prepared with an inner diameter of 10 mm for rotation with a rotator 200. An outer ring 800 of the aforementioned silicon nitride sintered body was prepared and dimensioned to maintain a prescribed clearance between the ring 800 and the inner ring 700. A thrust plate 600 of a silicon nitride ceramic sintered body was provided under the outer ring 800, with a prescribed clearance between the former and the latter.

Using the aforementioned testing machines for evaluating the bearing performance, the r.p.m. of the motor 300 for driving the rotators 200 was increased to set values and then maintained at each of the set values for 10 minutes. Thereafter the driving torques were measured with torque meters 400. The results are shown in FIG. 13.

Figure 13:
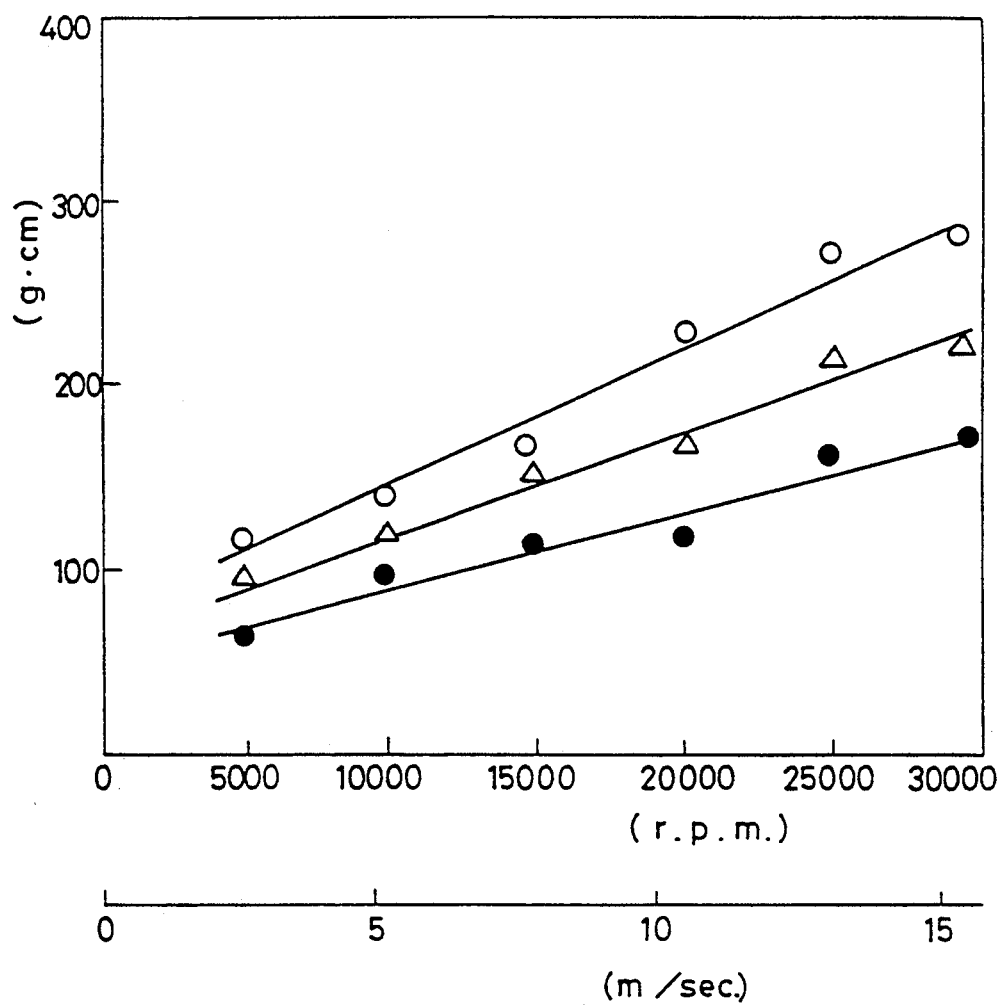
FIG. 13 is a graph showing driving torques (g.cm) as a function of rotating speeds (m/sec) illustrating the performance of Structural Examples G and D and of comparative structural example H.

FIG. 13 is a graph showing driving torques (g·cm) as a function of the r.p.m. or of the circumferential speeds (m/sec) of the inner peripheral surfaces of the inner rings of the rotators supported by Structural Examples G and D and comparative structural example H. Black dots, triangles and white circles show the results of Structural Example G and D and comparative example H respectively. As clearly understood from FIG. 13, the black dots of Structural Example G show the minimum ratio of the increase rate of the number of revolutions (circumferential speed) to that of the driving torque, while the triangles of Structural Example D show an intermediate ratio and the white circles of comparative structural example H show the maximum ratio.

As understood from the aforementioned measured results it is possible to effectively suppress an increase of the driving torque with respect to an increase of the rotating speed by employing a magnetic bearing member as a thrust-directional bearing member in the present composite bearing structure. In other words, it is most preferable to support a thrust-directional load, which most heavily contributes to an increase in the frictional resistance of the bearing member, by a magnetic bearing member.

The present composite bearing structure can be applied to a rotating polygon mirror for a laser printer, for example. Such a rotating polygon mirror for a laser printer will now be described.

Figure 14:
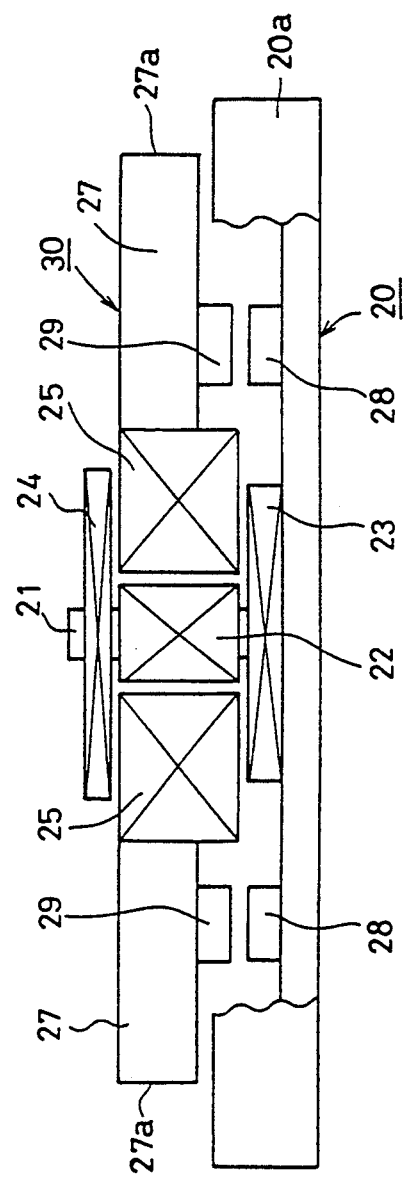
FIG. 14 shows schematically an example of a rotor with a composite bearing structure according to the invention for a polygon mirror.

FIG. 14 schematically illustrates an example of a rotating polygon mirror 30 which is employed for a laser printer. Referring to FIG. 14, a frame 20a of a motor 20 carries a shaft 21. A cylindrical ring 22 of the aforementioned silicon nitride sintered body is mounted on the outer periphery of the shaft 21. Further, flat thrust plates 23 and 24 of the aforementioned silicon nitride sintered bodies or permanent magnets are mounted on the base and forward ends of the shaft 21, respectively, whereby the plates 23, 24 are located on upper and lower sides of the inner ring 22. An outer ring 25, which serves as a rotator forming a pivotal portion of the rotating polygon mirror 30, is also made of the aforementioned silicon nitride sintered body in the form of a ring. Thus, the members 22, 23, 24 and 25 define a composite bearing structure corresponding to Structural Example A, C, D, E, F or G.

A reflecting frame 27 of aluminum is mounted on the outer periphery of the outer ring 25. Required clearances are defined between the inner and outer rings 22 and 25 and between the thrust plates 23 and 24 and the outer ring 25. A plurality of mirror surfaces 27a are provided on the outer periphery of the reflecting frame 27, to define a polyhedron such as an octahedron, for example, about the inner ring 22. On a bottom wall surface of the frame 20a, on the other hand, a plurality of coils 28 are arranged along a circumference which is concentric with the shaft 21. A plurality of permanent magnets 29 are arranged on the inner side surface of the reflecting frame 27, to be opposed to the coils 28. The outer ring 25 and the reflecting frame 27 define a rotor of the driving motor 20.

Tables 2, 3 and 4 the results of the performance evaluation of Structural Examples E, F and G applied to the rotating polygon mirror shown in FIG. 14.

Referring to Tables 2 to 4, stationary currents indicate current values of the driving motor measured when the polygon mirror reached intended rotation r.p.m., i.e., current values corresponding to the respective driving torques.

Inclination angles of the mirror surfaces were measured in order to evaluate degrees of vibration of the polygon mirror during rotation. Surface inclination angles appearing in Tables 2 to 4 indicate values of maximum vibration widths of all mirror surfaces.

Referring to Structural Example E, as shown in FIG. 5, the inner ring 1 has an outer diameter of φ20 mm and a length of 30 mm, while the clearance between the inner and outer rings 1 and 2 is 60 μm.

Referring to Structural Example F, as shown in FIG. 6(A), the inner ring 1 has an outer diameter of φ20 mm in the portion formed by the silicon nitride ceramic sintered body, and a length of 30 mm, while the clearance between the inner and outer rings 1 and 2 is 40 μm.

Referring to Structural Example G, as shown in FIG. 7(A), the inner ring 1 has an outer diameter of φ20 mm and a length of 30 mm, while the clearance between the inner and outer rings 1 and 2 is 2.5 μm.

TABLE 2

| Number of Revolutions (r.p.m.) | Stationary Current (A) | Surface Inclination Angle (Sec.) | |
|---|---|---|---|
| | | Initial Value | After Driving for 10,000 h. |
| 5,000 | 0.61 | 5.2 | 5.2 |
| 10,000 | 1.03 | 5.5 | 5.5 |
| 20,000 | 2.10 | 5.8 | 5.8 |
| 30,000 | 3.05 | 6.0 | 6.0 |
| 50,000 | 4.85 | 10.5 | 10.9 |
| 70,000 | 6.67 | 14.7 | 15.5 |
| 100,000 | 9.30 | 20.1 | 21.6 |

TABLE 3

| Number of Revolutions (r.p.m.) | Stationary Current (A) | Surface Inclination Angle (Sec.) | |
|---|---|---|---|
| | | Initial Value | After Driving for 10,000 h. |
| 5,000 | 0.42 | 3.1 | 3.1 |
| 10,000 | 0.71 | 3.8 | 3.8 |
| 20,000 | 1.40 | 4.7 | 4.7 |
| 30,000 | 2.05 | 6.1 | 6.1 |
| 50,000 | 3.28 | 10.3 | 10.8 |
| 70,000 | 4.48 | 14.1 | 14.6 |

TABLE 3-continued

| Number of Revolutions (r.p.m.) | Stationary Current (A) | Surface Inclination Angle (Sec.) | |
|---|---|---|---|
| | | Initial Value | After Driving for 10,000 h. |
| 100,000 | 6.25 | 18.5 | 19.2 |

TABLE 4

| Number of Revolutions (r.p.m.) | Stationary Current (A) | Surface Inclination Angle (Sec.) | |
|---|---|---|---|
| | | Initial Value | After Driving for 10,000 h. |
| 5,000 | 0.41 | 2.9 | 3.1 |
| 10,000 | 0.69 | 3.5 | 3.8 |
| 20,000 | 1.38 | 4.9 | 5.4 |
| 30,000 | 2.02 | 6.2 | 6.8 |
| 50,000 | 3.26 | 9.8 | 11.7 |
| 70,000 | 4.46 | 11.4 | 13.8 |
| 100,000 | 6.20 | 15.3 | 19.3 |

In each of the Structural Examples E, F and G, the surface inclination angle of the mirror is suppressed in a range of one minute after driving at a number of revocations of 100000 r.p.m. for 10000 hours. It is understood from the aforementioned results that a polygon mirror rotator employing the present composite bearing member exhibits an excellent rotational accuracy, even if a high speed rotation is carried out for a long time.

Referring to Tables 2 to 4, the bearing structures of Structural Examples E, F and G attained surface inclination angels of substantially similar degrees. When Structural Example G (Table 4) is employed, however, it is necessary to set the clearance between the inner and outer rings at a small value, as hereinabove described, When Structural Example E or F (Table 2 or 3) is employed, on the other hand, it is possible to set the clearance between the inner and outer rings at a relatively large value, as hereinabove described.

Figure 15:
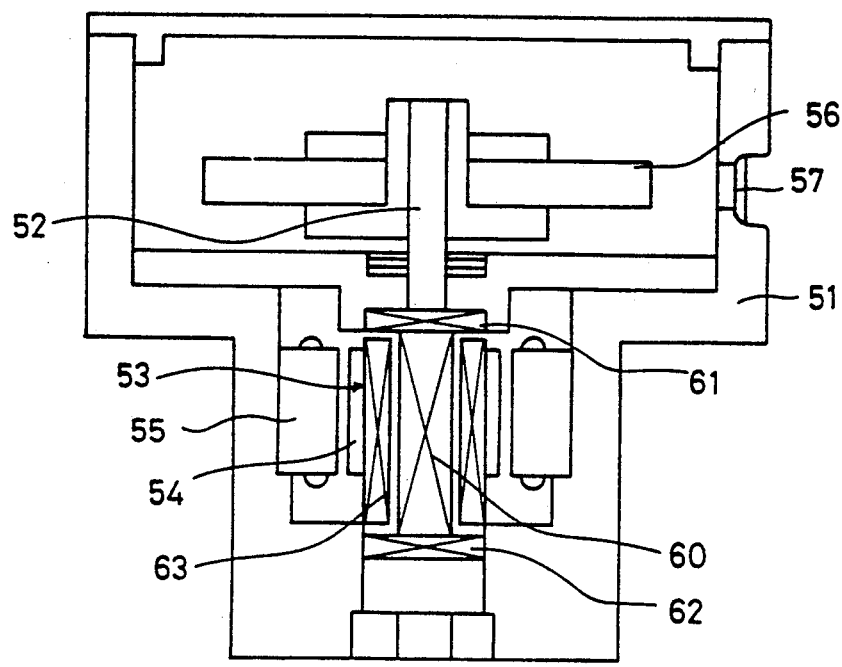
FIG. 15 shows schematically another exemplary rotator example of a rotor with a composite bearing structure according to the invention for a polygon mirror.
Figure 16:
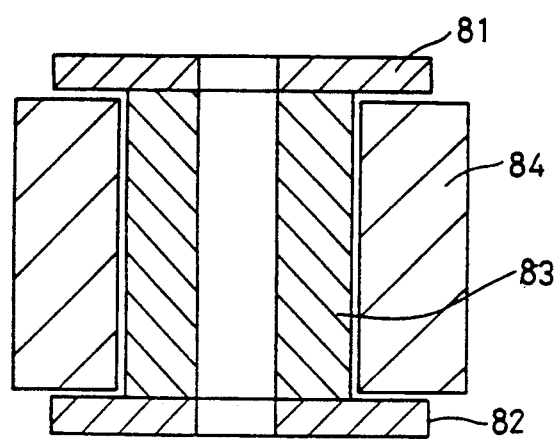
FIG. 16 is a longitudinal sectional view schematically showing the structure of a conventional busing type sleeve bearing member.

FIG. 15 schematically illustrates another exemplary polygon mirror rotator, to which the present composite bearing structure is applied. Referring to FIG. 15, a case 51 is provided on its axis with a rotary shaft 52, which is rotatably supported by a composite bearing member 53 formed by any one of Structural Examples A, C, D, E, F and G. This composite bearing member 53 is formed by an inner ring 60, thrust plates 61 and 62 and an outer ring 63. A rotor 54 is mounted on the outer ring 63 of the composite bearing member 53. The case 51 is further provided with a window 57, while a polygon mirror 56 is mounted on an upper portion of the rotary shaft 52, to be opposed to the window 57, Although the present composite bearing member is applied to a bearing member for a rotating polygon mirror, the present invention is not restricted to such an embodiment. The composite bearing member according to the present invention is also applicable to a bearing for a spindle or shaft drive motor for rotating a hard disk and a photomagnetic disk, a turbine bearing for a supercharger which rotates at a high speed of 80000 to 150000 r.p.m., a bearing for a turbine or a compressor which rotates at a high speed of 20000 to 30000 r.p.m., a high speed rotation bearing for a rocket engine turbo-pump, a bearing employed for a machine tool such as a CNC ultraprecise lathe, an ultraprecise lathe for working a cylinder or an ultraprecise surface grinding machine, or the like, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A composite bearing structure for supporting a rotator carrying a load for rotating at a high speed, said composite bearing structure comprising: first bearing means (1, 2) comprising a silicon nitride ceramic sintered body for supporting a radial impact force applied to said rotator during rotation, said silicon nitride ceramic sintered body containing silicon nitride crystal grains having a linear density of at lest 35 grains per 30 $\mu$m length, a boundary phase volume ratio of not more than 15 percent by volume and pores having a maximum diameter of 20 $\mu$m, said pores occupying 3 volume percent at the most, second dynamic gas pressure bearing means (6) for supporting by a gas pressure produced by rotation of said rotator an axial load applied to said rotator while maintaining an axial clearance between said second bearing means and said rotator; and third dynamic gas pressure bearing means (1, 2) for maintaining a radial clearance and rotational accuracy of said rotator, said dynamic gas pressure being produced by rotation of said rotator.

2. The composite bearing structure of claim 1, wherein said second dynamic gas pressure bearing means comprises a rotating member (2) rotating with said rotator and a fixed member (3) opposed to said rotating member (2) for maintaining said axial clearance.

3. The composite bearing structure of claim 2, wherein said rotating member (2) and said fixed member (3) comprise ceramic sintered bodies and grooves (6) formed in either one of said rotating and fixed members for introducing a gas into said axial clearance for producing said dynamic gas pressure.

4. The composite bearing structure of claim 1, wherein said third dynamic gas pressure bearing means includes a rotating member (2) rotating with said rotator and a fixed member (1) opposed to said rotating member for radially maintaining said rotational accuracy.

5. The composite bearing structure in accordance with claim 4, wherein said rotating member (2) and said fixed member (1) comprise ceramic sintered bodies, and groove means (5) in either one of said rotating member (2) and said fixed member (1) for producing said dynamic gas pressure by introducing a gas into said radial clearance for maintaining said rotational accuracy of said rotator.

6. A composite bearing structure for supporting a rotator carrying a load for rotating at a high speed, said composite bearing structure comprising: first bearing means (1, 2) including a ceramic sintered body for supporting a radial impact force applied to said rotator during rotation; second dynamic gas pressure bearing means (6) for supporting by a gas pressure produced by rotation of said rotator an axial load applied to said rotator while maintaining an axial clearance between said second bearing means and said rotator; and third magnetic bearing means (7, 8, 9, 10; 8, 10, 11; 7, 8, 14, 15) for maintaining a radial clearance and a rotational accuracy of said rotator by magnetic attraction or repulsion while maintaining said radial clearance between said third bearing means and said rotator, wherein said third magnetic bearing means includes a rotating member (2)

rotating with said rotator and a fixed member (1) positioned opposite to said rotating member while maintaining said radial clearance, and wherein said rotating member (2) and said fixed member (1) include magnets (7, 8, 9, 10, 11, 14, 15) for generating magnetic attraction or repulsion in said radial clearance, said rotating and fixed members comprising ceramic sintered bodies and magnets, wherein said ceramic sintered body of said rotating member is positioned opposed to said ceramic sintered body of said fixed member while radially maintaining a first radial clearance, and wherein said magnet of said rotating member is opposed to said magnet of said fixed member while radially maintaining a second clearance wider than said first clearance.

7. The composite bearing structure of claim 6, wherein said second dynamic gas pressure bearing means includes a rotating member (2) rotating with said rotator and a fixed member (3) positioned opposed to said rotating member while maintaining said axial clearance.

8. The composite bearing structure of claim 7, wherein said rotating member (2) and said fixed member (3) include ceramic sintered bodies, and wherein grooves (6) are formed in either one of said rotating and fixed members for producing said dynamic gas pressure by introducing a gas into said axial clearance.

9. The composite bearing structure of claim 6, wherein said ceramic sintered body of said first bearing means includes a silicon nitride ceramic sintered body.

10. The composite bearing structure of claim 9, wherein said silicon nitride ceramic sintered body contains silicon nitride crystal grains having a linear density of at least 35 grains per 30 $\mu$m length, a boundary phase volume ratio of not more than 15 percent by volume, and pores having a maximum diameter of 20 $\mu$m, said process occupying 3 volume percent at the most.

11. A composite bearing structure for supporting a rotator carrying a load for rotating at a high speed, said composite bearing structure comprising: first bearing means (1, 2) including a ceramic sintered body for supporting a radial impact force applied to said rotator during rotation; second dynamic gas pressure bearing means (6) for supporting by a gas pressure produced by rotation of said rotator an axial load applied to said rotator while maintaining an axial clearance between said second bearing means and said rotator; and third magnetic bearing means (7, 8, 9, 10; 8, 10, 11; 7, 8, 14, 15) for maintaining a radial clearance and a rotational accuracy of said rotator by magnetic attraction or repulsion while maintaining said radial clearance between said third bearing means and said rotator, wherein said third magnetic bearing means includes a rotating member (2) rotating with said rotator and a fixed member (1) positioned opposite to said rotating member while maintaining said radial clearance, and wherein said rotating member (2) and said fixed member (1) include magnets (7, 8, 9, 10, 11, 14, 15) for generating magnetic attraction or repulsion in said radial clearance, and wherein said rotating and fixed members are formed by said ceramic sintered bodies, said magnets (11) being embedded in said ceramic sintered bodies.

12. The composite bearing structure in accordance with claim 11, wherein said dynamic pressure gas bearing means includes a rotating member (2) rotating with said rotator and a fixed member (3) being opposed to said rotating member while axially maintaining said clearance.

13. The composite bearing structure in accordance with claim 12, wherein said rotating member (2) and said fixed member (3) include ceramic sintered bodies, grooves (6) being formed in either one of said rotating and fixed members for introducing a gas into said clearance in order to produce said gas pressure.

14. The composite bearing structure of claim 11, wherein said ceramic sintered body of said first bearing means includes a silicon nitride ceramic sintered body.

15. The composite bearing structure of claim 14, wherein said silicon nitride ceramic sintered body contains silicon nitride crystal grains having a linear density of at least 35 grains per 30 $\mu$m length, a boundary phase volume ratio of not more than 15 percent by volume, and pores having a maximum diameter of 20 $\mu$m, said pores taking up 3 volume percent at the most.

16. A composite bearing structure for supporting a rotator carrying a load for rotating at a high speed, said composite bearing structure comprising: first bearing means (1, 2) comprising a silicon nitride ceramic sintered body for supporting a radial impact force applied to said rotator during rotation, said silicon nitride ceramic sintered body containing silicon nitride crystal grains having a linear density of at least 35 grains per 30 $\mu$m length, a boundary phase volume ratio of not more than 15 percent by volume, and pores having a maximum diameter of 20 $\mu$m, said process occupying 3 volume percent at the most, second dynamic gas pressure bearing means (6) for supporting by a gas pressure produced by rotation of said rotator an axial load applied to said rotator while maintaining an axial clearance between said second bearing means and said rotator, and third bearing means (1, 2) including a ceramic sintered body for maintaining a radial clearance and a rotational accuracy of said rotator.

17. The composite bearing structure in accordance with claim 16, wherein said dynamic pressure gas bearing means includes a rotating member (2) rotating with said rotator and a fixed member (3) being opposed to said rotating member while axially maintaining said clearance.

18. The composite bearing structure in accordance with claim 17, wherein said rotating member (2) and said fixed member (3) include ceramic sintered bodies, grooves (6) being formed in either one of said rotating and fixed members for introducing a gas into said clearance in order to produce said gas pressure.

19. A composite bearing structure for supporting a rotator carrying a load for rotating at a high speed, said composite bearing structure comprising: first bearing means (1, 2) comprising a silicon nitride ceramic sintered body for supporting a radial impact force applied to said rotator during rotation, said silicon nitride ceramic sintered body containing silicon nitride crystal grains having a linear density of at least 35 grains per 30 $\mu$m length, a boundary phase volume ratio of not more than 15 percent by volume, and pores having a maximum diameter of 20 $\mu$m, said process occupying 3 volume percent at the most, second magnetic bearing means (12, 13; 15, 16; 10, 17) for supporting by magnetic attraction or repulsion an axial load applied to said rotator while maintaining an axial clearance between magnetic bearing means and said rotator; and third dynamic gas pressure bearing means (1, 2) for maintaining a radial clearance and a rotational accuracy of said rotator by gas pressure produced by rotation of said rotator.

20. The composite bearing structure of claim 19, wherein said second magnetic bearing means includes a rotating member (2, 12) rotating with said rotator and a fixed member (3, 13) opposed to said rotating member while maintaining said axial clearance.

21. The composite bearing structure of claim 20, wherein said rotating member (2, 12) and said fixed member (3, 13) includes magnets (12, 13, 10, 17, 15, 16) for generating magnetic attraction or repulsion in said axial clearance.

22. The composite bearing structure of claim 19, wherein said third dynamic gas pressure bearing means includes a rotating member (2) rotating with said rotator and a fixed member (1) opposed to said rotating member while maintaining said radial clearance.

23. The composite bearing structure in accordance with claim 22, wherein said rotating member (2) and said fixed member (1) comprise ceramic sintered bodies, and groove means (5) in either one of said rotating member (2) and said fixed member (1) for producing said dynamic gas pressure by introducing a gas into said radial clearance for maintaining said rotational accuracy of said rotator.

24. A composite bearing structure for supporting a rotator carrying a load for rotating at a high speed, said composite bearing structure comprising: first bearing means (1, 2) including a ceramic sintered body for supporting a radial impact force being applied to said rotator during rotation; second magnetic bearing means (12, 13; 15, 16; 10, 17) for supporting by magnetic attraction or repulsion an axial load applied to said rotator while maintaining an axial clearance between said second magnetic bearing means and said rotator; third magnetic bearing means (7, 8, 9, 10; 8, 10, 11; 7, 8, 14, 15) for maintaining a radial clearance and a rotational accuracy of said rotator through magnetic attraction or repulsion while maintaining said radial clearance between said third magnetic bearing means and said rotator, wherein said third magnetic bearing means includes a rotating member (2) rotating with said rotator and a fixed member (1) opposed to said rotating member while maintaining said radial clearance, and wherein said rotating member (2) and said fixed member (1) include magnets (7, 8, 9, 10, 11, 14, 15) for generating magnetic attraction or repulsion in said radial clearance, and wherein said rotating and fixed members are formed by said ceramic sintered bodies and said magnets, said ceramic sintered body of said rotating member being opposed to said ceramic sintered body of said fixed member, while maintaining a first radial clearance, and wherein said rotating magnet member being opposed to said fixed magnet member while maintaining a second radial clearance wider than said first radial clearance.

25. The composite bearing structure of claim 24, wherein said second magnetic bearing means includes a rotating member (2, 12) rotating with said rotator and a fixed member (3, 13) opposed to said rotating member while maintaining said axial clearance.

26. The composite bearing structure of claim 25, wherein said rotating member (2, 12) and said fixed member (3, 13) include magnets (12, 13, 10, 17, 15, 16) for generating magnetic attraction or repulsion in said axial clearance.

27. The composite bearing structure of claim 24, wherein said ceramic sintered body of said first bearing means includes a silicon nitride ceramic sintered body.

28. The composite bearing structure of claim 27, wherein said silicon nitride ceramic sintered body contains silicon nitride crystal grains having a linear density of at least 35 grains per 30 $\mu$m length, a boundary phase volume ratio of not more than 15 percent by volume, and pore shaving a maximum diameter of 20 $\mu$m, said pores occupying 3 volume percent at the most.

29. A composite bearing structure for supporting a rotator carrying a load for rotating at a high speed, said composite bearing structure comprising: first bearing means (1, 2) including a ceramic sintered body for supporting a radial impact force being applied to said rotator during rotation; second magnetic bearing means (12, 13; 15, 16; 10, 17) for supporting by magnetic attraction or repulsion an axial load applied to said rotator while maintaining an axial clearance between said second magnetic bearing means and said rotator; and third magnetic bearing means (7, 8, 9, 10; 8, 10, 11; 7, 8, 14, 15) for maintaining a radial clearance and a rotational accuracy of said rotator by a magnetic attraction or repulsion while maintaining said radial clearance between said third magnetic bearing means and said rotator, wherein said third magnetic bearing means includes a rotating member (2) rotating with said rotator and a fixed member (1) opposed to said rotating member while radially maintaining said radial clearance, wherein said rotating member (2) and said fixed member (1) include magnets (7, 8, 9, 10, 11, 14, 15) for generating magnetic attraction or repulsion in said radial clearance, and wherein said rotating and fixed members are formed by said ceramic sintered bodies, said magnets (11) being embedded in said ceramic sintered bodies.

30. The composite bearing structure of claim 29, wherein said second magnetic bearing means includes a rotating member (2, 12) rotating with said rotator and a fixed member (3, 13) opposed to said rotating member while maintaining said axial clearance.

31. The composite bearing structure of claim 30, wherein said rotating member (2, 12) and said fixed member (3, 13) include magnets (12, 13, 10, 17, 15, 16) for generating magnetic attraction or repulsion in said axial clearance.

32. The composite bearing structure of claim 29, wherein said ceramic sintered body of said first bearing means includes a silicon nitride ceramic sintered body.

33. The composite bearing structure of claim 32, wherein said silicon nitride ceramic sintered body contains silicon nitride crystal grains having a linear density of at least 35 grains per 30 $\mu$m length, a boundary phase volume ratio of not more than 15 percent by volume, and pores having a maximum diameter of 20 $\mu$m, said pores occupying 3 volume percent at the most.

34. A composite bearing structure for supporting a rotator carrying a load for rotating at a high speed, said composite bearing structure comprising: first bearing means (1, 2) including a silicon nitride ceramic sintered body for supporting a radial impact force applied to said rotator during rotation, said silicon nitride ceramic sintered body containing crystal grains having a linear density of at least 35 grains per 30 $\mu$length, a boundary phase volume ratio of not more than 15 percent by volume, and pores having a maximum diameter of 20 $\mu$m, said pores occupying 3 volume percent at the most, second magnetic bearing means (12, 13; 15, 16; 10, 17) for supporting by magnetic attraction or repulsion an axial load applied to said rotator while maintaining an axial clearance between said second magnetic bearing means and said rotator; and third being means (1, 2) including a ceramic sintered body for maintaining a radial rotational accuracy of said rotator, and a radial clearance between said third bearing means and said rotor.

35. The composite bearing structure of claim 34, wherein said second magnetic bearing means includes a rotating member (2, 12) rotating with said rotator and a fixed member (3, 13) opposed to said rotating member while maintaining said axial clearance.

36. The composite bearing structure of claim 35, wherein said rotating member (2, 12) and said fixed member (3, 13) include magnets (12, 13, 10, 17, 15, 16) for generating magnetic attraction or repulsion in said axial clearance.

37. A composite bearing structure for supporting a rotator carrying a required load for rotating at a high speed, said composite bearing structure comprising: first bearing means (1, 2) including a ceramic sintered body for supporting a radial impact force applied to said rotator during rotation; second magnetic bearing means (12, 13; 15, 16; 10, 17) for supporting by magnetic attraction or repulsion an axial load applied to said rotator while maintaining an axial clearance between said magnetic bearing means and said rotator; and third bearing means including a ceramic sintered body for maintaining a radial rotational accuracy of said rotator and for maintaining a radial clearance between said third bearing means and said rotator, and wherein said third bearing means including a rotating member rotating with said rotator and a fixed member opposed to said rotating member while maintaining said radial clearance and wherein said rotating and fixed members of said third bearing means are formed by ceramic sintered bodies.

38. The composite bearing structure of claim 37, wherein said second magnetic bearing means includes a rotating member (2, 12) rotating with said rotator and a fixed member (3, 13) opposed to said rotating member while maintaining said axial clearance.

39. The composite bearing structure of claim 38, wherein said rotating member (2, 12) and said fixed member (3, 13) include magnets (12, 13, 10, 17, 15, 16) for generating magnetic attraction or repulsion in said axial clearance.

40. The composite bearing structure of claim 37, wherein said ceramic sintered body of said first bearing means includes a silicon nitride ceramic sintered body.

41. The composite bearing structure of claim 40, wherein said silicon nitride ceramic sintered body contains silicon nitride crystal grains having a linear density of at least 35 grains per 30 $\mu$m length, a boundary phase volume ratio of not more than 15 percent by volume, and pores having a maximum diameter of 20 $\mu$m, said pores occupying 3 volume percent at the most.

* * * * *

UNITED STATES PATENT AND TRADEMARK OFFICE
CERTIFICATE OF CORRECTION

PATENT NO. : 5,280,208

DATED : January 18, 1994

INVENTOR(S) : Osamu Komura et al.

It is certified that error appears in the above-identified patent and that said Letters Patent is hereby corrected as shown below:

Column 17, line 37, replace "process" by --pores--;

Column 18, line 28, replace "process" by --pores--;

Column 18, line 59, replace "process" by --pores--;

Column 20, line 4, replace "pore shaving" by --pores having--;

Column 20, line 58, replace "µlength" by --µm length--;

Column 21, line 26, replace "rotator" by --rotor--;

Column 22, line 3, after "clearance" insert --,--.

Signed and Sealed this

Thirty-first Day of May, 1994

Attest:

BRUCE LEHMAN

*Attesting Officer*     *Commissioner of Patents and Trademarks*